(12) United States Patent
Sprakel et al.

(10) Patent No.: US 12,044,332 B2
(45) Date of Patent: Jul. 23, 2024

(54) METHOD FOR MONITORING FIRE-FIGHTING SYSTEM VALVE WITH SENSOR ARRANGED OUTSIDE THE VALVE

(71) Applicant: FOGTEC Brandschutz GmbH, Cologne (DE)

(72) Inventors: Dirk K. Sprakel, Cologne (DE); Rüdiger E. Kopp, Cologne (DE); Ulrich Hiltemann, Wermelskirchen (DE)

(73) Assignee: FOGTEC Brandschutz GmbH, Cologne (DE)

( * ) Notice: Subject to any disclaimer, the term of this patent is extended or adjusted under 35 U.S.C. 154(b) by 696 days.

(21) Appl. No.: 17/263,830

(22) PCT Filed: Apr. 18, 2019

(86) PCT No.: PCT/EP2019/060104
§ 371 (c)(1),
(2) Date: Jan. 27, 2021

(87) PCT Pub. No.: WO2020/035175
PCT Pub. Date: Feb. 20, 2020

(65) Prior Publication Data
US 2021/0293354 A1 Sep. 23, 2021

(30) Foreign Application Priority Data
Aug. 15, 2018 (DE) .................. 10 2018 119 798.5

(51) Int. Cl.
*F16K 37/00* (2006.01)
*A62C 35/68* (2006.01)
(Continued)

(52) U.S. Cl.
CPC .......... *F16K 37/0083* (2013.01); *A62C 35/68* (2013.01); *A62C 37/50* (2013.01);
(Continued)

(58) Field of Classification Search
CPC .. F16K 37/0058; F16K 27/12; F16K 37/0041; F16K 37/0083; G01M 3/30; G01M 3/2876; A62C 37/50
See application file for complete search history.

(56) References Cited

U.S. PATENT DOCUMENTS 5,329,465 A * 7/1994 Arcella ............... F16K 37/0083
706/915
5,950,150 A * 9/1999 Lloyd .................... A62C 37/50
714/809

(Continued)

FOREIGN PATENT DOCUMENTS

CN 1662764 A 8/2005
CN 1726366 A 1/2006

(Continued)

OTHER PUBLICATIONS

China National Intellectual Property Adminstration, Notification of the First Office Action, Application No. 201980054495.7, dated Aug. 12, 2022, 12 pages.

(Continued)

*Primary Examiner* — Tran M. Tran
(74) *Attorney, Agent, or Firm* — Sunstein LLP

(57) ABSTRACT

Method for monitoring valves, in particular valves of a fire fighting system, comprising capturing first sensor signals at a valve in an intact state with a sensor, training the monitoring with the first sensor signals captured at the valve in the intact state, capturing second sensor signals at the valve in an unknown state with the sensor, comparing the trained first sensor signals with the second sensor signals and outputting a signal in case of a deviation of the second sensor signals from the first sensor signals above a limit value.

9 Claims, 5 Drawing Sheets

(51) Int. Cl.
*A62C 37/50* (2006.01)
*G01M 3/28* (2006.01)
*F16K 27/12* (2006.01)

(52) U.S. Cl.
CPC ...... *F16K 37/0041* (2013.01); *F16K 37/0058* (2013.01); *G01M 3/2876* (2013.01); *F16K 27/12* (2013.01)

(56) References Cited

U.S. PATENT DOCUMENTS

| | | | | |
|---|---|---|---|---|
| 6,637,267 | B2* | 10/2003 | Fiebelkorn | F16K 37/0083 73/659 |
| 6,895,130 | B1* | 5/2005 | Mengle | F16K 37/0041 385/12 |
| 6,976,503 | B2* | 12/2005 | Ens | F16K 37/0083 73/168 |
| 7,080,694 | B2* | 7/2006 | Boyle | A62C 37/50 169/44 |
| 7,124,057 | B2* | 10/2006 | Forster | F15B 19/005 702/182 |
| 7,621,179 | B2* | 11/2009 | Ens | F16K 37/0083 73/592 |
| 8,072,343 | B2* | 12/2011 | Flanders | F16K 37/0083 137/551 |
| 8,091,860 | B2* | 1/2012 | Thompson | F16K 37/0083 137/554 |
| 8,576,086 | B2* | 11/2013 | Vidal | F15B 15/2807 340/686.2 |
| 8,752,639 | B2* | 6/2014 | Long | A62C 37/11 169/17 |
| 9,041,534 | B2* | 5/2015 | McSheffrey | A62C 13/76 340/286.07 |
| 9,205,293 | B2* | 12/2015 | Grenning | G01M 1/00 |
| 9,810,346 | B2* | 11/2017 | Scherer | F16K 1/12 |
| 9,904,296 | B2* | 2/2018 | Peczalski | G05D 7/0635 |
| 9,989,167 | B2* | 6/2018 | Podpaly | F16K 37/0058 |
| 10,143,871 | B1* | 12/2018 | Ike | A62C 35/64 |
| 10,166,565 | B2* | 1/2019 | Lemkin | A01G 25/167 |
| 10,317,264 | B1* | 6/2019 | Nesselle | G01M 1/00 |
| 10,441,833 | B2* | 10/2019 | Pohl | A62C 35/605 |
| 10,520,109 | B2* | 12/2019 | Hofer | F16K 51/02 |
| 10,765,899 | B2* | 9/2020 | Pohl | A62C 35/605 |
| 10,773,113 | B2* | 9/2020 | Pohl | F16K 37/0041 |
| 10,843,018 | B1* | 11/2020 | Ike | A62C 35/64 |
| 10,843,020 | B2* | 11/2020 | Goyette | A62C 37/50 |
| 10,850,145 | B2* | 12/2020 | Goyette | G01M 3/045 |
| 11,007,390 | B2* | 5/2021 | Böke | G07C 11/00 |
| 11,406,856 | B2* | 8/2022 | Kempf | F16K 15/03 |
| 11,458,341 | B2* | 10/2022 | Goyette | A62C 37/50 |
| 11,497,951 | B2* | 11/2022 | Wilson | F24F 13/14 |
| 11,504,561 | B2* | 11/2022 | Kempf | F16K 27/067 |
| 11,577,109 | B2* | 2/2023 | Goyette | A62C 37/04 |
| 11,692,903 | B2* | 7/2023 | Genta | F16K 37/0066 137/557 |
| 11,713,984 | B2* | 8/2023 | Sapija | G01D 5/34707 250/229 |
| 11,752,379 | B1* | 9/2023 | Ike | A62C 37/50 700/282 |
| 11,878,196 | B2* | 1/2024 | Goyette | A62C 37/50 |
| 2006/0042699 | A1 | 3/2006 | Heer | |
| 2006/0131038 | A1* | 6/2006 | Lichtig | A62C 33/06 169/52 |
| 2009/0165866 | A1* | 7/2009 | Fima | F16K 5/0605 137/551 |
| 2013/0107035 | A1* | 5/2013 | Afonso | F16K 37/0058 348/125 |
| 2013/0155227 | A1* | 6/2013 | Ferik | G01B 11/00 348/143 |
| 2013/0228005 | A1 | 9/2013 | Suedel et al. | |
| 2014/0238512 | A1 | 8/2014 | Bowers | |
| 2016/0186890 | A1 | 6/2016 | Bense | |
| 2017/0100617 | A1* | 4/2017 | Kochelek | A62C 37/50 |
| 2018/0169451 | A1 | 6/2018 | Moffa | |
| 2020/0132219 | A1* | 4/2020 | Thompson | F15B 15/2876 |
| 2020/0409321 | A1* | 12/2020 | Sanchez Del Valle | H02J 3/381 |
| 2022/0236102 | A1* | 7/2022 | Aldossary | G01G 19/413 |
| 2023/0151905 | A1* | 5/2023 | Rosén | F16K 37/0058 137/559 |

FOREIGN PATENT DOCUMENTS

| | | |
|---|---|---|
| CN | 108 253 176 A | 7/2018 |
| CN | 108253176 A | 7/2018 |
| DE | 102007040568 A1 | 3/2009 |
| DE | 10 2013 019 601 A1 | 5/2015 |
| EP | 0478668 A1 | 4/1992 |
| EP | 0478668 B1 | 4/1992 |
| EP | 0489596 A1 | 6/1992 |
| EP | 1555472 A1 | 7/2005 |
| EP | 1570199 A1 | 9/2005 |
| EP | 3030819 A1 | 6/2016 |
| KR | 2018 0036252 A | 4/2018 |
| WO | WO 2012/031743 A1 | 3/2012 |
| WO | WO 2013/180821 A1 | 12/2013 |

OTHER PUBLICATIONS

China National Intellectual Property Administration, Notification of the Second Office Action, Application No. 201980054495.7, dated Mar. 29, 2023, 12 pages.

International Searching Authority/EP, International Search Report and Written Opinion of the International Searching Authority, Application No. PCT/EP2019/060104, maled Jul. 11, 2019, with English translation of the search report, 17 pages.

German Patent Office, Office Action, Application No. 10 2018 119 798.5, dated Jun. 3, 2019, 5 pages, (in German).

European Patent Office, Office Action, Application No. 19722527.9, dated Mar. 20, 2023, 7 pages (in German).

* cited by examiner

METHOD FOR MONITORING FIRE-FIGHTING SYSTEM VALVE WITH SENSOR ARRANGED OUTSIDE THE VALVE

CROSS-REFERENCE TO RELATED APPLICATIONS

This application is the national phase entry of international patent application no. PCT/EP2019/060104 filed Apr. 18, 2019 and claims the benefit of German patent application No. 10 2018 119 798.5, filed Aug. 15, 2018, the disclosures of which are incorporated herein by reference in their entirety.

TECHNICAL FIELD

The subject matter relates to a method for monitoring valves and/or pressure cylinders.

BACKGROUND ART

The monitoring of valves in widely branched pipe systems, for example of valves and/or pressure cylinders in fire-fighting systems for tunnels or rail vehicles, has so far required considerable manual effort. At regular maintenance intervals, the valves must be subjected to at least a visual inspection. This results from the high demands on the availability of these safety-relevant components as well as from the relevant standards and regulations. Here, a service technician must inspect each individual valve to ensure that the valves are also functional in the event of a fire. This also applies to pressure cylinders that are permanently filled with extinguishing liquid.

This maintenance effort is time-consuming and cost-intensive. In addition, the inspection described does not always ensure that the valves are actually functional in the event of a fire. Between two maintenance intervals, a valve and/or pressure cylinder may suffer a defect. However, such a defect is only detected during the next inspection. If a fire occurs between the time of the defect and the inspection, the valve or pressure cylinder in question may be inoperable, hampering firefighting.

For this reason, the subject matter was based on the object of increasing the functional reliability of valves and/or pressure cylinders, especially in fire-fighting systems. Another object was to extend the distances between two maintenance intervals.

SUMMARY OF THE INVENTION

It has been recognized that defects in valves and/or pressure cylinders generally lead to changes in features characterizing the valve and/or pressure cylinder. Such features may, for example, relate to the outer appearance of the valve. For example, in the case of leakage, incrustations can form around the leakage point, which can be detected by means of visual inspection. Also, in the area of a leak, color changes may occur on the valve and/or the pressure cylinder, or the reflective behavior of the material of the valve may change. The vibration and oscillation behavior during motorized adjustment of a valve can be altered, for example, in the case of incrustations or other mechanical defects within the valve body compared to an intact valve. Due to increased friction caused by a defect, a temperature profile on a valve or on its motor may be altered compared to an intact valve. Due to increased torque during adjustment of the valve, an actuator motor located on a defective valve will possibly absorb increased power compared to an actuator motor on an intact valve. Also, when a valve is defective, it may not be able to fully move to its end position or return to its initial position.

These and other features can all be detected with appropriate sensors. In order to be able to determine whether a valve and/or pressure cylinder is defective, it is proposed that first sensor signals are detected with a sensor at the valve and/or pressure cylinder in the intact state. These first sensor signals are read in for each sensor and the monitoring is trained with these first sensor signals. This means that first sensor signals from a valve and/or pressure cylinder are available for monitoring, with which the valve and/or pressure cylinder can be identified as intact. First sensor signals can be captured by one or different sensors. If first sensor signals are detected by different sensors, faults in the valve and/or the pressure cylinder can possibly be detected more reliably or earlier.

With the trained first sensor signals, the valve and/or the pressure cylinder can be checked at any later time by capturing second sensor signals with the sensor at the valve and/or the pressure cylinder in an unknown state. This means that the same sensor by which the first sensor signals were acquired measures the valve and/or the pressure cylinder in an unknown state. An unknown state is always present if a time has passed between the last inspection and the current reading of the second sensor signals. The second sensor signals can also be detected by sensors different from each other.

The presence of the trained first sensor signals makes it possible to compare the first sensor signals with the second sensor signals for inspection. If a deviation of the second sensor signals from the first sensor signals occurs and if this deviation is greater than a predetermined limit value, a signal can be output. This signal can be used to initiate a manual inspection of the valve and/or to issue a warning signal. During this manual inspection, the valve and/or the pressure cylinder can be checked to determine whether it is actually defective and a replacement or repair can be initiated.

In particular, a combination of sensor signals from different sensors can be useful. Thus, a joint, possibly weighted evaluation of the sensor signals from different sensors can take place, so that changes to different mechanical properties of the valve and/or pressure cylinder are evaluated together. It has been recognized that a defect often leads to a change in multiple properties. The evaluation of multiple sensor signals from different sensors can account for this phenomenon.

In particular, the present evaluation can be useful in the field of predictive maintenance. It is proposed that during the evaluation of the sensor signals, an exceeding of a limit value, which may be smaller than the above-mentioned limit value, already outputs a maintenance signal. The deviation of the sensor signals can be an indication of wear without the valve and/or the pressure cylinder actually being defective. Thereby, maintenance can be carried out before a defect occurs so that the failure safety of the component is further increased. If the following refers to a defect, what is said there can also apply to wear without the component already being defective.

The sensor signals detected with the sensors can be very different. In particular, a sound sensor, an image sensor, a thermal sensor, a vibration sensor, a humidity sensor, a pressure sensor, a current sensor, and/or a position sensor can be used alone or in combination with any other of these sensors.

A valve may be motorized and the valve may thereby be adjusted by means of a motor. For maintenance purposes, the adjustment of a valve is performed, for example, at time intervals, in particular to prevent incrustations. During such an adjustment of the valve by means of a motor, which is triggered for inspection purposes, a mechanical property of the valve can be detected with a sound sensor and/or a vibration sensor. Vibrations and/or structure-borne sound can be altered on valves with incrustations or other mechanical defects compared to such valves that are intact. Vibrations and noises can be detected at the valve using a sound sensor and/or a vibration sensor. These can be compared with the trained first sensor signals and thus a defective valve can be identified.

A valve is usually enclosed in a valve cabinet (valve box). The ambient conditions of the valve are thus always relatively constant inside the housing. A pressure cylinder can also be enclosed in a housing, such as a technical room. If an image of the valve and/or the pressure cylinder is captured with an image sensor, this image may already show information about a change in the valve and/or the pressure cylinder, if applicable. In case of leakages or other incrustations, changes may be visually recognizable on the outer skin of the valve and or the pressure cylinder. An image captured with the image sensor shows these changes and thus enables detection of a defective valve and/or pressure cylinder. The changes can be detected visually on a monitor or by means of suitable digital image processing. The image sensor can be located inside the valve cabinet or the housing.

It is also possible for the image sensor to be arranged on the outside of the valve cabinet/enclosure and to be guided in the manner of an endoscope through an opening, in particular a drill hole, into the interior of the valve cabinet/enclosure. With the aid of the endoscopic optics, the interior of the valve cabinet or housing can then be recorded by a camera arranged on the outside of the valve cabinet or housing. In this case, the opening can be sealed in a moisture-proof manner, e.g. via a circumferential seal, in particular a sealing strip, e.g. a rubber seal. The material of the seal can be formed in such a way that it increases its volume, in particular swells, under the influence of water and/or at elevated temperatures, in order to reliably seal the interior of the valve cabinet or the housing from the exterior in the event of fire. The seal may be arranged on the inside and/or outside of the opening and/or in the region of the inner wall of the opening.

According to one embodiment, the image sensor may be mobile. This makes it possible to sequentially inspect multiple valve cabinets/enclosures with one system. The system can be inserted by maintenance personnel into the opening provided for this purpose. The opening can be designed so that the viewing angle of the optical sensor in the housing is always exactly the same.

If increased friction occurs due to mechanical defects in the valve during adjustment of the valve, this increased friction also leads to an increased temperature in the valve, its motor and/or the supply line to the motor. A thermal sensor, in particular an infrared sensor, can be used, for example, to detect the thermal profile of the valve during a motorized adjustment of the valve.

If the valve and/or the pressure cylinder is in particular in a protected environment, for example the valve box (housing, enclosure), leakages can also be detected by a humidity sensor.

Extinguishing fluid, for example water, is present at the inlet of the valve in so-called wet systems. In wet systems, the extinguishing fluid is also present at the outlet of the valve. By means of pressure sensors at the inlet and/or outlet of the valve pressure changes and/or pressure differences can be detected. The valve can thus be detected as defective. Even in dry-biased systems, a gas pressure is present in the pipeline, which can be detected with the pressure sensor.

A moisture sensor at the outlet of the valve can also be used to detect a leak in the valve in a dry system, since moisture then passes through the valve from its possibly wet inlet to the otherwise dry outlet.

By means of a current sensor, for example, the current drawn by the servomotor on the valve can be detected when it is adjusting the valve. Increased friction, which can occur due to incrustations, for example, results in increased torque, which leads to increased current consumption by the motor. This can be detected with the aid of the current sensor.

Finally, end positions of the valve can also be detected with a position sensor. A position sensor can be a limit switch, a proximity sensor, e.g. an inductive proximity sensor or the like. Due to incrustations or other mechanical impairments, the valve may not be able to be fully opened and/or fully closed and thus the valve may not reach its end position. This can be detected with the aid of the position sensor. In particular, end position switches can detect the position of the valve. A position of a valve can also be determined by means of image evaluation and evaluated accordingly.

It is often useful to detect a temporal evolution of the sensor signals. In particular, the sensor signals are time-variant. The sensor signals can be acquired over a longer period of time. In order to be able to perform a comparison of the trained first sensor signals with the second sensor signals, in particular a cross-correlation, e.g., an SSD correlation, between the first and second sensor signals is proposed. The lower the correlation of the sensor signals to each other is, the larger their deviation. It is also possible to cross-correlate image signals, for example individual images, which have been captured with an image sensor, for example a CCD sensor, a CMOS sensor or the like.

It is also possible that the acquired first and second image signals are compared in such a way that pixel values, for example values for chroma and/or luma components of the pixels, are compared and a deviation of these is determined. The absolute value of all deviations over an image can be detected. If this is above a limit value, it can be concluded that something has changed in the sensor or its external appearance.

As already described, it is possible that valves and/or the pressure cylinder are arranged in valve boxes/enclosures provided for this purpose. These valve boxes/enclosures contain the valves together with servomotors, power supply and, if necessary, connections to a communication bus. The valve box/enclosure is closed after installation. In such a valve box/enclosure, ambient conditions remain relatively identical over time; in particular, there is no external light source in such a valve box/enclosure that could influence the acquisition of image signals. In order to enable good results in the acquisition of image signals, it is proposed that the valve/pressure cylinder is illuminated by an illuminating means during the acquisition of the image signal. The illuminating means can be provided together with the image sensor in a structural unit and illuminate the valve/pressure cylinder at the moment the image is captured. The illuminating means may emit light in the visible range and/or in the infrared range and/or ultraviolet range.

According to an embodiment, it is proposed that the valve and/or the pressure cylinder and the sensor are enclosed in a common housing. In this housing, which is for example a valve box, the ambient conditions stay sufficiently constant for an evaluation. The sensor signals are recorded inside the housing. The housing ensures that changes to the sensor signals can only be caused by changes to components present inside the housing. This is in particular the valve and/or the pressure cylinder, which is to be monitored objectively.

The comparison of the first sensor signals with the second sensor signals is to take place at regular intervals or continuously. Therefore, it is proposed that the second sensor signals are acquired at intervals, in particular at regular intervals. After acquisition, the second sensor signals are compared with the first sensor signals either directly on site, in a processor arranged for example in the valve box. It is also possible that first and second sensor signals are transmitted from the sensor to a central monitoring unit via a communication link, wireless or wired, in particular via optical fiber. There, the detected sensor signals can be evaluated as described.

For this reason, it is proposed that the sensor signals are transmitted from the sensor to an evaluation unit remote from the sensor and communicating with a plurality of sensors by wire, in particular by optical fiber, or wirelessly, in particular by LoRa or Wlan. A central evaluation device can thus perform an evaluation over a plurality, preferably all of the sensors of a system, in particular a firefighting system.

According to an embodiment, it is proposed that the first and second sensor signals are compared with each other in a processor arranged directly on the valve and/or in the housing and/or the pressure cylinder, and the comparison result is transmitted to a remote evaluation device by wire, in particular by optical fiber or wirelessly, in particular by LoRa or Wlan. This considerably reduces the communication effort. A processor for comparing the sensor signals is inexpensive and can be arranged on each valve/pressure cylinder. The valve/pressure cylinder thus performs a self-test together with the sensor and supplies the result of the self-test to the evaluation device.

As already described, the valves are in particular area valves of a fire fighting system. Also, the valves may be main valves or shut-off valves in particular of a fire fighting system The valve may be a valve of a fire fighting system. In particular, it may be an area valve or a main valve. Other water-operated operating means of a fire-fighting system can also be monitored according to the subject matter. In particular, a pressure cylinder (water cylinder) can be monitored instead of a valve. For this purpose, a method for monitoring pressure cylinders, in particular pressure cylinders of a fire-fighting system, is proposed, comprising capturing first sensor signals at a pressure cylinder in an intact state with a sensor, training the monitoring with the first sensor signals captured at the pressure cylinder in the intact state, capturing second sensor signals at the pressure cylinder in an unknown state with the sensor, comparing the trained first sensor signals with the second sensor signals, and outputting a signal in the event of a deviation of the second sensor signals from the first sensor signals above a limit value.

The pressure cylinders can be installed stationary in the area of a fire fighting system and hold extinguishing liquid, in particular water, which is expelled from the pressure cylinder in case of fire. However, the pressure cylinders can also be mobile, in particular installed in the area of a rail vehicle, e.g. on the roof or in a technical room, and are monitored according to the subject-matter.

All embodiments in this document that also relate to the monitoring of valves can also be applied to pressure cylinders and are hereby also claimed.

BRIEF DESCRIPTION OF THE DRAWINGS

In the following, the subject matter is explained in more detail with reference to a drawing showing embodiments. In the drawing show.

DETAILED DESCRIPTION OF SPECIFIC EMBODIMENTS

Figure 1:
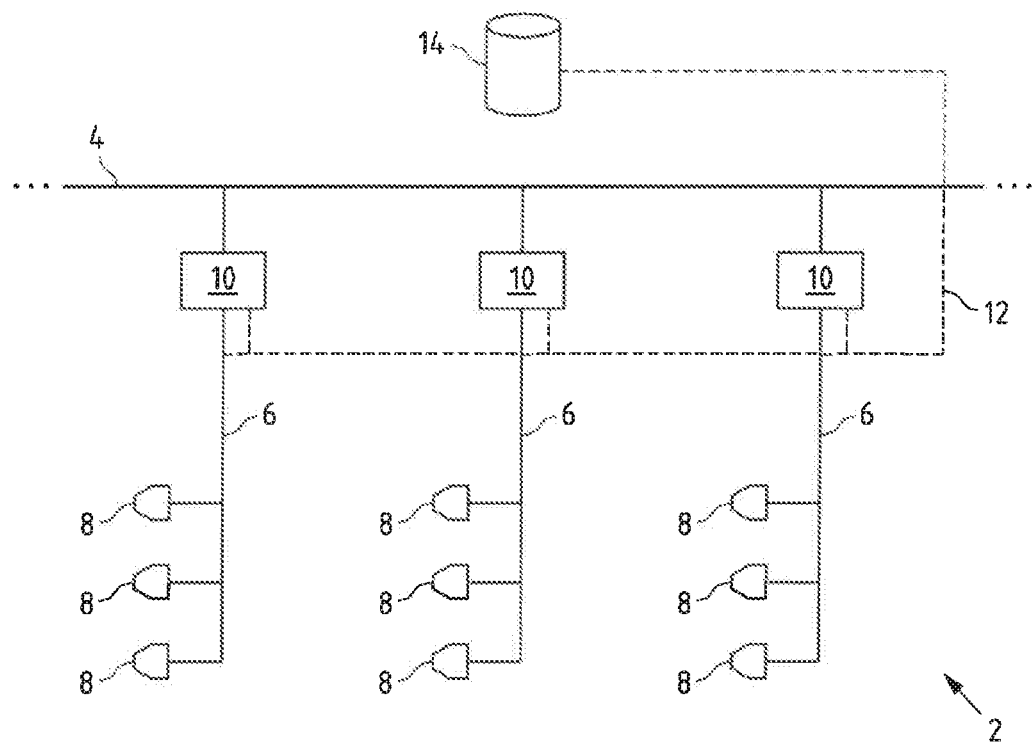
FIG. 1 a schematic structure of a fire fighting system.

FIG. 1 shows a fire fighting system 2 with a main distribution line 4 as well as area lines 6. Extinguishing nozzles/extinguishing mist nozzles 8 are arranged on the area lines 6 as required. The area strands 6 are connected to the main strand 4 via area valves 10. The area valves 10 and the devices provided for monitoring and controlling the area valves 10 are connected to a control center 14 via a communication bus 12. A communication bus may be a CAN bus.

Via the communication bus 12, the control center 14 can control the valves 10 or the valve motors and, if necessary, receive sensor signals.

In the idle state, the area valves 10 are in an idle position, which may be either an open position or a closed position.

At maintenance intervals, the control center 14 controls the motors of the area valves 10 to move from the rest position to a maintenance position and/or an active position, which may be an open position or a closed position, to check the functionality of the valves 10. In the case of a wet system, the area valve 10 is closed in the rest position. For maintenance, a downstream maintenance valve is closed, the area valve 10 is opened and closed again, and then the maintenance valve is opened again.

In the event of a fire, an area in which a fire is present is detected by means of a fire alarm control panel, video surveillance or an operator. Depending on this, one or more of the area valves 10 are opened so that extinguishing fluid can flow, if necessary, first into the main line and then, if necessary, from the main line 4 into the respective area line 6, where it can be discharged via the respective extinguishing nozzles 8. Unquestionably the operation of the area valves 10 is essential to the operation of the fire suppression system 2. However, a manual check of the valves is costly and time-consuming.

Figure 2:
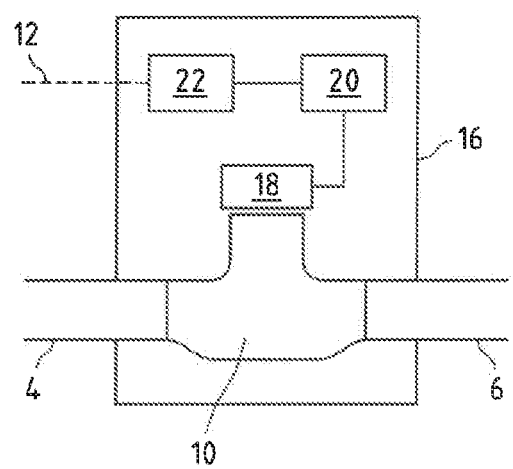
FIG. 2 a schematic structure of a valve box.

In FIG. 2, an area valve 10 is shown in a valve box 16. The valve box 16 is a closable housing into which the piping of the main line 4 leads and the piping of the range line 6 leads out. The valve 10 is arranged inside the valve box 16. An adjustment motor 18 is provided on the valve 10, with which the valve 10 can be opened and closed in a motorized manner. Instead of the adjustment motor 18, a magnetic drive can also be provided in a magnetic valve 10. The examples presented here thus also apply to solenoid valves.

The adjustment motor 18 is controlled via a processor 20. The valve 10, the servomotor 18 and the processor 20 are connected to the communication bus 12 via a communication device 22.

Figure 3A:
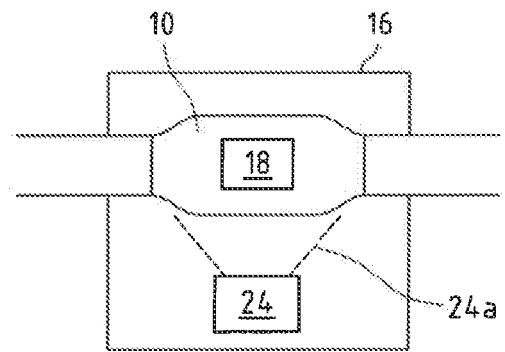
FIG. 3a an arrangement of a sensor in a valve box.

For inspection purposes, an image sensor 24, for example, may be provided in the valve box 16 in addition to the aforementioned components, as shown in FIG. 3*a*. The image sensor 24 may be, for example, a CCD sensor or a CMOS sensor. The image sensor 24 may be oriented such that its field of view 24*a* covers the valve 10 together with the motor 18 and, if applicable, parts of the piping from the main line 4 and area line 6. The sensor 24 is connected to the processor 20. In addition to the image sensor 24, a light source may be provided in the valve box 16 to at least partially illuminate the valve box 16 at the moment the image is captured.

Figure 3B:
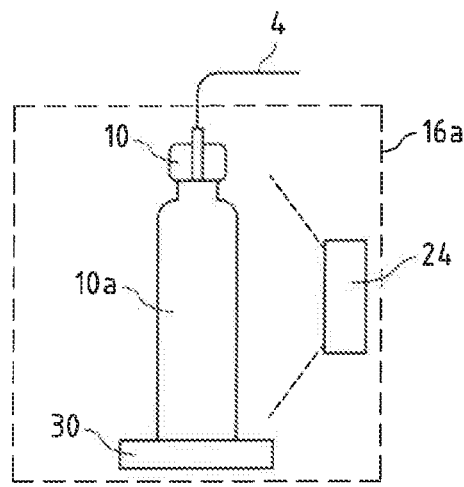
FIG. 3b an arrangement of a pressure cylinder in a housing.

For inspection purposes, an image sensor 24, for example, may be provided in the housing 16*a* in addition to the aforementioned components, as shown in FIG. 3*b*. The image sensor 24 may be, for example, a CCD sensor or a CMOS sensor. The image sensor 24 may be oriented such that its field of view 24*a* covers the pressure cylinder 10*a* including the valve 10 and, if applicable, parts of the piping from the main line 4 and area line 6. The sensor 24 is connected to the processor 20. In addition to the image sensor 24, a light source may be provided in the housing 16 that at least partially illuminates the housing 16 at the moment the image is captured. In particular, a humidity sensor may be arranged at the bottom of the housing 10*a* to detect a humidity in the area of the pressure cylinder 10*a*. A valve 10 according to the subject matter may be arranged on a pressure cylinder 10*a* and be monitored.

Figure 4:
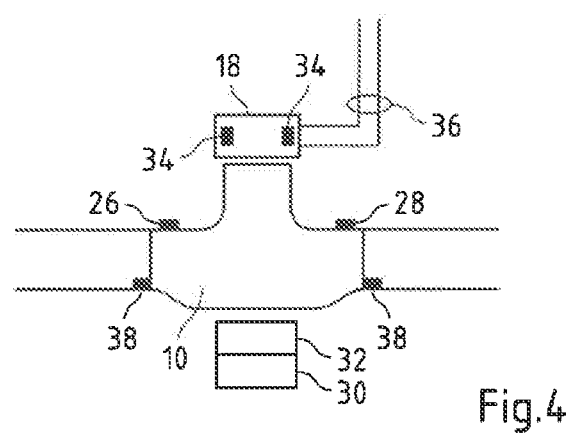
FIG. 4 the arrangement of different sensors at a valve.

A wide variety of sensors can be arranged cumulatively or alternatively to one another at the valve 10 and at the motor 18 as well as at the lines connected to the valve 10 and at the pressure cylinder. FIG. 4 shows a number of different sensors as examples.

For example, a structure-borne sound sensor 26 can be arranged on the valve 10. Also, a motion sensor 28 may be arranged on the valve 10. Furthermore, a humidity sensor 30 may be provided in the valve box 16. Furthermore, a temperature sensor or thermal image sensor 32 may also be arranged in the housing 16. Position sensors 34 (or position switches) may be provided at the motor 18, which may sense a orientation/position of a valve position. A current sensor 36 may also be provided on the supply line to the motor 18. In addition, pressure sensors 38 and/or moisture sensors may be provided in the piping 4, 6. A wide variety of sensors 24-38 can be used to detect sensor signals at the valve 10 and the actuator motor 18.

In an intact state of the valve 10, the sensors may detect first sensor signals. Such sensor signals are shown by way of example in FIGS. 5*a*, 6*a*, 7*a*. These sensor signals may be used to train the monitoring system. During an operation, second sensor signals can then be detected again with the same sensor, as shown in FIGS. 5*b*, 6*b*, 7*b*. These second sensor signals can be compared to the first sensor signals and a deviation can be detected. Such a deviation may be indicative of a defect in the valve 10.

Figure 5A:
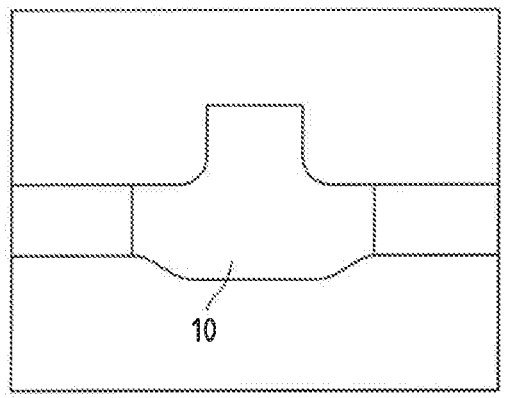
FIG. 5a,b the change of image information.
Figure 5B:
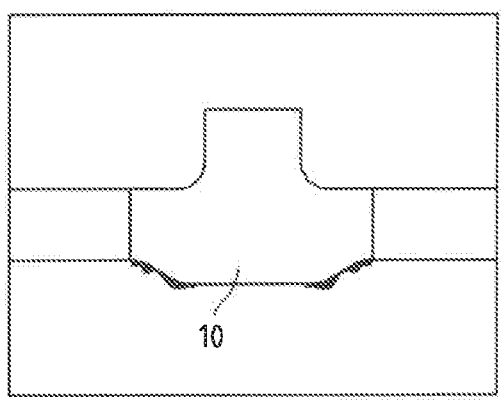

FIG. 5*a* shows, for example, an image of the image sensor 24 of the valve 10. No incrustations or other deposits can be seen on the valve 10. After a certain amount of time, for example after a few years, the same image sensor 24 can be used to take the image shown in FIG. 5*b*, for example. Deposits can be seen on the underside of the valve 10, which may be caused by leakage or condensation, for example.

By a pixel comparison of the pixels of the image according to FIG. 5*a* with the pixels of the image according to FIG. 5*b*, it can be determined that a number of pixels have different chroma and/or luma values. If the number of pixels that differ is greater than a threshold value, a signal can be output.

Figure 6A:
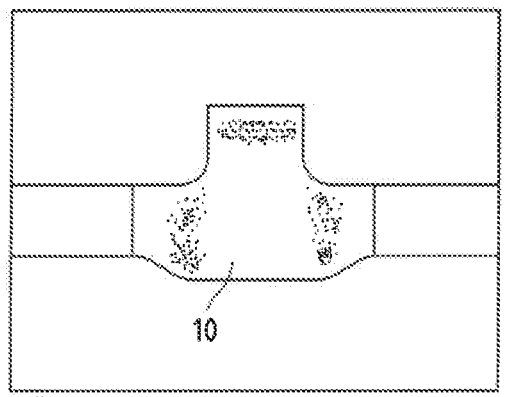
FIG. 6a,b the change of thermal information.
Figure 6B:
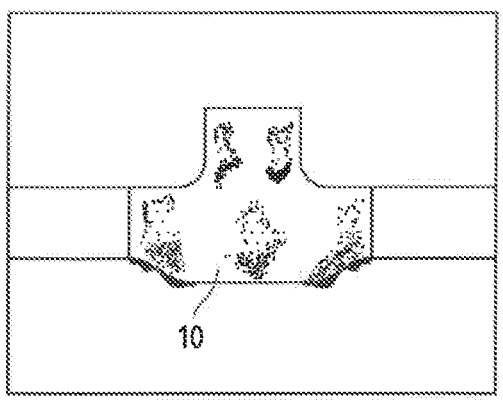

FIGS. 6*a* and *b* show exemplary images of a temperature sensor 32. For maintenance purposes, the adjustment motor 18 is driven to move the valve 10 to a maintenance position, for example. This generates frictional heat which, as can be seen in FIG. 6*a*, can be seen in the temperature image. The image 6*b* of the temperature sensor 32 shows the valve 10 in an unknown state. This image is also taken during a movement of the actuator 18 to a maintenance position. A changed thermal profile can be seen. By comparing the thermal images shown in FIGS. 6*a* and *b*, it can be determined that the temperature distribution at the valve 10 is different, which may also indicate a need for maintenance.

Figure 7A:
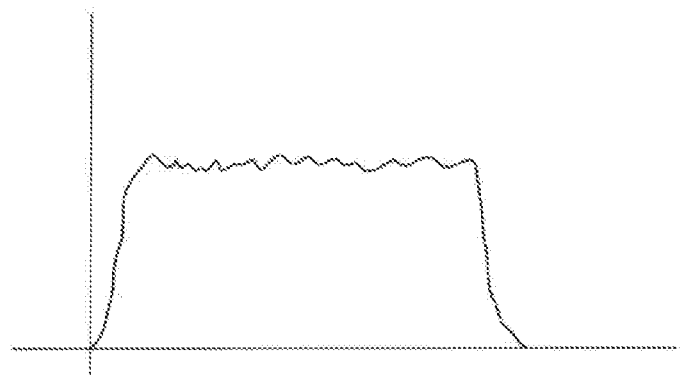
FIG. 7a-c the comparison of time-variant sensor signals.
Figure 7B:
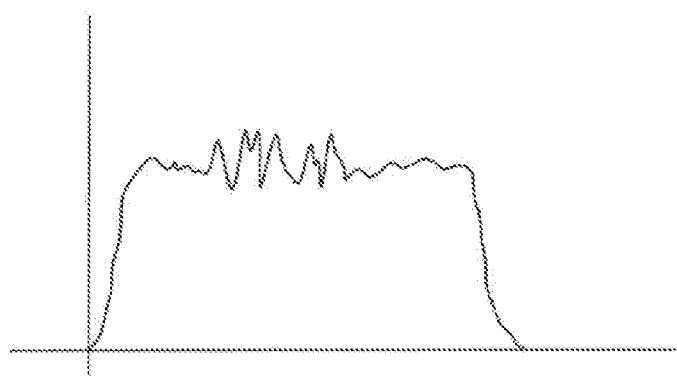
Figure 7C:
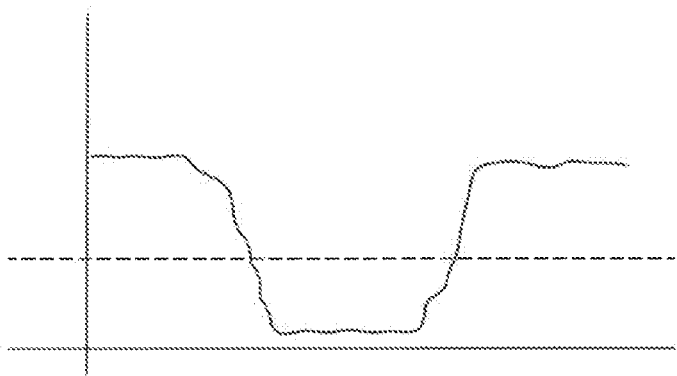

FIGS. 7*a* and *b* show the profile of, for example, the structure-borne sound at the valve 10 when the motor 18 moves the valve 10 from a closed position to a maintenance position. FIG. 7*a* shows the sound profile in an intact condition and FIG. 7*b* shows the sound profile at the same valve 10 in an unknown condition. By cross-correlating the profiles according to FIGS. 7*a* and *b*, it can be determined, as shown in FIG. 7*c*, that the time course of the sound signal no longer correlates at certain times. In this case, the value of the correlation falls below a threshold value. Such threshold crossing can indicate a need for maintenance.

The acquisition of the sensor signals is carried out with the sensors, as described above, in the valve box 16. The processor 20 can transmit these sensor signals to the control center 14 or evaluate the first and second sensor signals independently and transmit a signal to the control center 14 only if a need for maintenance is detected.

With the aid of the method shown, it is possible in a particularly simple manner to automatically inspect valves 10 which are spatially distributed over a large area.

LIST OF REFERENCE SIGNS 2 fire fighting system
4 main line strand
6 area pipe strand
8 extinguishing nozzle
10 valve
10*a* pressure cylinder
12 communication bus
14 control center
16 valve box
16*a* housing
18 adjustment motor
20 processor
22 communication device
24 image sensor
26 sound sensor
28 motion sensor
30 humidity sensor
32 temperature sensor
34 position sensor
36 current sensor
38 pressure sensor

What is claimed is:

1. Method for monitoring fire fighting system main or area valves, comprising:
   acquisition of first sensor signals at a fire fighting system main or area valve in an intact state with a sensor;

training the monitoring with the first sensor signals captured at the valve in an intact state;

capturing second sensor signals at the valve in an unknown state with the sensor; and comparing the trained first sensor signals with the second sensor signals, and outputting a signal in case of a deviation of the second sensor signals from the first sensor signals above a limit value wherein the valve and the sensor are enclosed in a common housing, the sensor is arranged outside the valve and the sensor signals are captured within the housing.

2. Method according to claim 1,
wherein the sensor signals are captured by
a sound sensor,
an image sensor,
a thermal sensor,
a vibration sensor,
a humidity sensor,
a pressure sensor
a current sensor and/or
a position sensor.

3. Method according to claim 1, wherein the first and second sensor signals are cross-correlated.

4. Method according to claim 1, wherein the sensor signals are image signals of an image sensor and wherein the image signals are compared with one another, in particular wherein a deviation of pixel values is determined.

5. Method according to claim 4, wherein when the image signals are captured, the valve is illuminated by illumination means.

6. Method according to claim 1, wherein the second sensor signals are captured at intervals, in particular at regular intervals.

7. Method according to claim 1, wherein the sensor signals are transmitted from the sensor to an evaluation device remote from the sensor communicating with a plurality of sensors by wire or wirelessly.

8. Method according to claim 1, wherein the first and second sensor signals are compared with one another in a processor which is arranged directly at the valve, and the comparison result is transmitted to a remote evaluation device.

9. System arranged to monitor fire-fighting system main or area valves, comprising:

a sensor enclosed together with a fire-fighting system main or area valve in a housing, wherein the sensor is arranged outside the valve;

a processor arranged to train the monitoring with the first sensor signals captured at the valve in an intact state;

wherein the sensor is arranged to capture first sensor signals inside the housing at the valve in an intact state;

wherein the sensor is arranged to capture second sensor signals inside the housing at the valve in an unknown state; and the processor is arranged to compare the trained first sensor signals with the second sensor signals and to issue an alarm signal if the second sensor signals deviate from the first sensor signals by more than a limit value and not to issue the alarm signal if the second sensor signals deviate from the first sensor signals by less than the limit value.

* * * * *